Nov. 21, 1950 — R. J. S. BROWN ET AL — 2,531,106
POCKET RADIATION ALARM
Filed July 8, 1949

WITNESSES:

INVENTORS:
Robert J.S. Brown
Herbert G. Weiss

Patented Nov. 21, 1950

2,531,106

UNITED STATES PATENT OFFICE 2,531,106

POCKET RADIATION ALARM

Robert J. S. Brown, Lawndale, Calif., and Herbert G. Weiss, Waltham, Mass., assignors to the United States of America as represented by the United States Atomic Energy Commission Application July 8, 1949, Serial No. 103,712

3 Claims. (Cl. 250—83.6)

This invention relates to a compact, portable apparatus for indicating the presence of radioactive material. More particularly, this invention relates to a pocket radiation alarm that will give a signal when a predetermined amount of radioactivity is present.

The harmful effects of radioactivity are well known. Workers handling radioactive material, or working in the vicinity of radioactivity are sometimes subjected to accidental exposure to dangerous emanations. Considerable bodily damage may result from exposure to radioactive material without any immediate sensible indications. It is therefore necessary to provide a signaling apparatus to warn persons when they approach unprotected radioactive materials.

Prior to this invention, means for determining the amount of radioactivity received by a worker have made use of a film badge or electrometers. In the use of the film badge the amount of exposure to radioactive material is not known until after the film in the badge is developed. The electrometers indicate when there is a dangerous amount of radioactivity present, but this requires continuous observation. Other types of apparatus for indicating presence of radioactivity are large in size and therefore, because a worker must carry the apparatus in order to be protected, these types of apparatus are inconvenient, and may be neglected to the detriment of the worker.

It is therefore an object of this invention to provide an apparatus which will at all times give a signal when radioactivity is present.

It is a further object of this invention to provide an apparatus that will give a signal when a predetermined amount of radioactivity is present.

It is a further object of this invention to provide a light weight apparatus which may be carried on the person and which will sound an alarm when a predetermined amount of radioactivity is being received.

It is a further object of this invention to provide a simplified form of mechanical construction for an apparatus using an ionization chamber.

It is still another object to provide a radiation alarm of size small enough to be carried in a pocket.

A still further object of this invention is to provide an apparatus with a suitable accurate integrating circuit so that a signal will be given when radioactive exposure exceeds a safe value.

Other objects and advantages of the present invention will be apparent from the following specification taken in connection with the drawings made part hereof and the description of a presently preferred embodiment.

Figure 1:
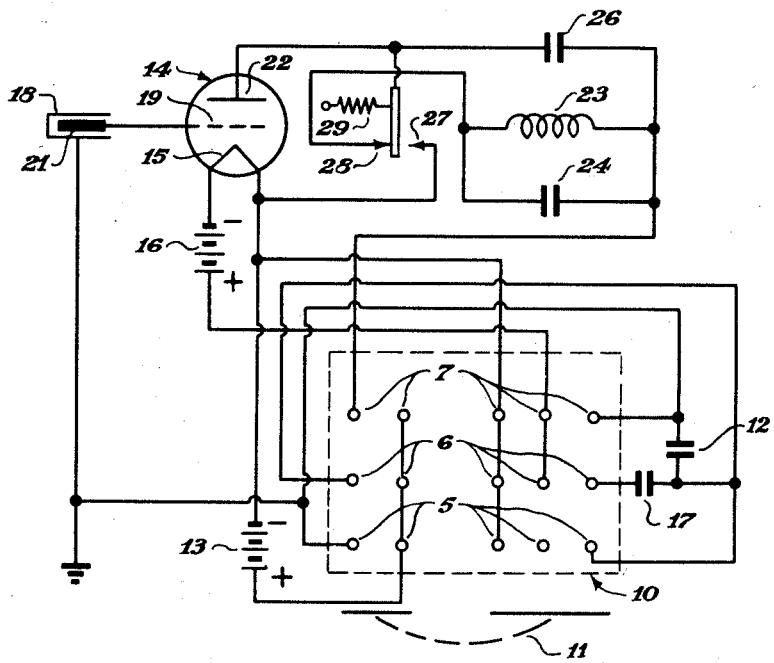
Figure 1 is a schematic circuit diagram of a pocket radiation alarm showing details of the invention.

Referring to Figure 1, the device of the present invention includes the following main elements: an ionization chamber 18 of convenient size, an electrometer type amplifier tube 14, a relay actuated by coil 23, a voltage doubler comprising condensers 12 and 17, a charging battery 13, a filament battery 16, and a switch 10. Switch 10 includes contactor 11 to effect closing of the plurality of circuits associated with three positions indicated by the three horizontal banks of contacts 5, 6, and 7.

The contactor 11 of switch 10 comprises two metallic strips to give continuity between contacts in the banks of contacts of switch 10. If contactor 11 is pressed in the first position indicated by reference numeral 5, condenser 12 is charged to a positive potential corresponding to that of battery 13. When contactor 11 is pressed into the second position indicated by reference numeral 6, filament 15 of tube 14 is connected across battery 16. Also while contactor 11 is in the second position condenser 17 is charged to a positive potential corresponding to that of battery 13. Inasmuch as condensers 12 and 17 are connected in series their potentials are additive and this positive potential of the condensers is applied to the outer wall of the ionization chamber 18. As a consequence, the ionization chamber center electrode, or anode 21, takes on a negative charge with respect to its outer wall 18. The negative charge on anode 21 will remain substantially constant for a long period of time in the absence of ionization in the chamber.

In the third or operating position of contactor 11 indicated by reference numeral 7, the outer wall of ionization chamber 18 is returned to the filament 15 of tube 14. With the outer wall of ionization chamber 18 connected to filament 15 the anode 21 of ionization chamber 18 is charged to approximately twice the potential of battery 13. Since anode 21 is negative, grid 19 of tube 14 will be negative by the same potential with respect to ground. The anode 22 of tube 14 is impressed with a positive potential by connection to battery 13 through relay coil 23.

When the ionization chamber 18 becomes conductive due to radiation induced ionization, the potential of grid 19 of tube 14 will approach the potential of cathode 15 causing a small amount of anode current to be drawn through relay coil 23. Due to the current drawn through high resistance relay coil 23, condenser 24 connected in parallel therewith will take on a charge. This charge in condenser 24 provides a current through the relay coil after external connection to the coil is broken, thus continuing movement of the relay armature to a contact position 27. When the relay armature is in contact position 27 condenser 26 will be charged to the battery potential. When condenser 26 is charged to the battery potential 13 the relay armature will quickly drop back to its normal operating contact position 28 under the influence of relay retention spring 29, which places the charge that is on condenser 26 across the relay coil 23. This heavy charge placed across the relay coil 23 causes the armature to move vigorously to contact position 27. The charging and discharging of the two condensers 24 and 26 results in a much more energetic relay vibration than could be obtained from the tube 14 anode current alone.

It follows that the discharging of condensers 24 and 26 into relay coil 23 causes the energetic audible movement thereof as will the functioning thereof as both a relay and an alarm buzzer. Furthermore, with the relay coil 23 connected in this manner a small amount of current is drawn by tube 14 from battery 13. It should be noted that current is drawn from battery 13 only when tube 14 conducts due to radiation induced ionization on ionization chamber 18.

The circuit of this invention may be utilized in searching for radioactive materials. The ionization chamber may be so constructed as to give an alarm when a predetermined concentration of radioactive products are present.

Figure 2:
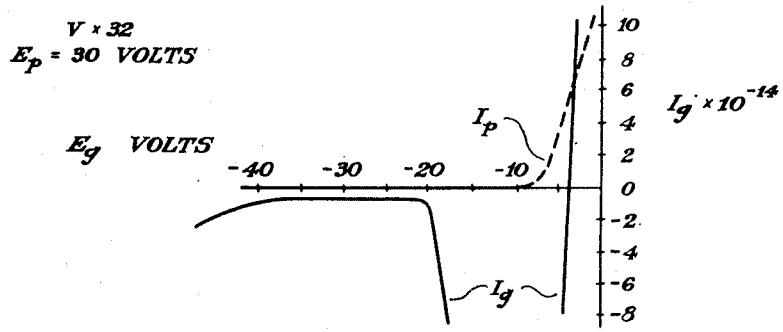
Figure 2 is a characteristic graph of an electrometer type low grid current tube.

A specific example of the invention disclosed makes use of an electrometer type low grid current tube (Victoreen) VX-32. Figure 2 is a characteristic curve of this tube. It is seen from the curve of grid current vs. grid voltage that the grid impedance is very high when the grid voltage is highly negative. When, for example, the ionization chamber discharges to a potential of about 20 volts the input impedance of the tube decreases until it drops to the point where the grid current becomes zero. This floating grid condition determines the current available in the anode circuit. The anode current is approximately 0.75 milliampere which is sufficient to energize a sensitive relay in the anode circuit.

It will thus be seen that what has been described herein is a simple, compact radiation alarm. Many variations in the arrangement of the system or in the network described will now be apparent to one skilled in the art without departing from the sphere and scope of the invention as defined in the appended claims.

What is claimed is:

1. In a radiation alarm device, a thermionic tube having at least a cathode, a grid and an anode, means for energizing said grid in the presence of radiation products, a relay having an armature and a contact on each of two opposed sides thereof and having an actuating coil and an armature retention means opposed thereto, a first condenser connected in shunt with said coil, a source of potential having a positive and a negative terminal, means connecting the positive terminal to one end of said coil and the negative terminal to the relay contact adjacent the actuating coil, means connecting the other end of the coil to the remaining relay contact, and means connecting the armature to the said anode, a second condenser connected between the positive potential source terminal and the armature, whereby an increase in anode current in response to energization of said grid causes said relay armature to alternately charge the first and second condensers from the potential source and alternately discharge the first and second condenser through the actuating coil to cause the energetic reciprocation of the armature to generate an audible sound.

2. In a radiation alarm device, an ionization chamber having a first and a second electrode, a thermionic tube having at least a cathode, a grid and an anode, said grid being connected to the second electrode, a source of potential having positive and negative terminals, means for doubling said potential, and means for impressing said doubled potential across said first and second electrode with a polarity such that the second electrode is negative with respect to the first electrode, means for energizing said grid in the presence of radiation products, a relay having an armature and a contact on each of two opposed sides thereof and having an actuating coil and armature retention means opposed thereto, a first condenser connected in shunt with said coil, means connecting the positive terminal of said source of potential to one end of said coil and the negative terminal to the relay contact adjacent the actuating coil, means connecting the other end of the coil to the remaining relay contact, and means connecting the armature to the said anode, a second condenser connected between the positive terminal of said source of potential and the armature whereby an increase in anode current in response to energization of said grid causes said relay armature to alternately charge the first and second condensers from the potential source and alternately discharge the first and second condenser through the actuating coil to cause the energetic reciprocation of the armature to generate an audible sound.

3. In a radiation alarm device, an ionization chamber having a first and a second electrode, a thermionic tube having at least a cathode, a grid and an anode, said grid being connected to the said second electrode, a source of potential having positive and negative terminals, a third and fourth condenser, switching means connected thereto, said switching means having first, second and third positions, said first position connecting one end of said third condenser to the positive terminal of said source of potential and the other end being connected to said negative terminal for charging same, said second position connecting one terminal of said fourth condenser to the positive terminal of said source of potential and the other terminal being connected to said negative terminal for charging same, whereby said third and fourth condensers are connected in series thereby impressing substantially twice the voltage of said potential source across said first and second electrodes with a polarity such that the second electrode is negative with respect to the first electrode, said switch third position connecting said first electrode to said cathode for continuity between said ionization chamber and said thermionic tube, means for energizing said grid in the presence of radiation products, a relay having an armature and a contact on each of two opposed sides thereof and having an actuating coil and an armature retention means opposed thereto, a first condenser connected in shunt with said coil, means connecting the positive terminal of said source of potential to one end of said coil and the negative terminal to the relay contact adjacent the actuating coil, means connecting the other end of the coil to the remaining relay contact, and means connecting the armature to the said anode, a second condenser connected between the positive terminal of said source of potential and the armature, whereby an increase in anode current in response to energization of said grid causes said relay armature to alternately charge the first and second condensers from the potential source and alternately discharge the first and second condenser through the actuating coil to cause the energetic reciprocation of the armature to generate an audible sound.

ROBERT J. S. BROWN.
HOWARD G. WEISS.

REFERENCES CITED

The following references are of record in the file of this patent:

FOREIGN PATENTS

| Number | Country | Date |
|---|---|---|
| 259,185 | Germany | Nov. 16, 1910 |

OTHER REFERENCES

Atomic Energy Commission Publication MDDC—884—2 pages, Jan. 17, 1947.